United States Patent
Manning et al.

(10) Patent No.: US 6,539,025 B1
(45) Date of Patent: Mar. 25, 2003

(54) PRIORITY ARBITRATION FOR POINT-TO-POINT AND MULTIPOINT TRANSMISSION

(75) Inventors: Thomas A. Manning, Northboro, MA (US); Stephen A. Caldara, Sudbury, MA (US); Stephen A. Hauser, Burlington, MA (US); Matthias L. Colsman, Cologne (DE)

(73) Assignees: Fujitsu Network Communications, Inc., Richardson, TX (US); Fujitsu Limited, Kawasaki (JP)

( * ) Notice: Subject to any disclaimer, the term of this patent is extended or adjusted under 35 U.S.C. 154(b) by 0 days.

(21) Appl. No.: 09/268,500

(22) Filed: Mar. 11, 1999

Related U.S. Application Data (63) Continuation of application No. 08/683,153, filed on Jul. 18, 1996, now Pat. No. 5,956,342.
(60) Provisional application No. 60/001,498, filed on Jul. 19, 1995.

(51) Int. Cl.[7] ............................................... H04L 12/28
(52) U.S. Cl. ....................................... 370/414; 370/235
(58) Field of Search ..................... 370/395.2, 395.31, 370/395.4, 414, 429, 432, 905, 353, 352, 389, 413, 428, 415, 416, 417, 418, 419, 468, 250, 252, 254, 351, 391, 392, 395.1, 399, 230, 235, 229, 442, 347, 461, 462; 340/825.5; 709/235

(56) References Cited

U.S. PATENT DOCUMENTS

| | | | |
|---|---|---|---|
| 5,051,982 A | * | 9/1991 | Brown ........................ 370/381 |
| 5,392,280 A | * | 2/1995 | Zheng ......................... 370/353 |
| 5,838,681 A | * | 11/1998 | Bonomi et al. .............. 370/353 |
| 5,956,342 A | * | 9/1999 | Manning et al. ............ 370/414 |

* cited by examiner

Primary Examiner—Dang Ton
(74) Attorney, Agent, or Firm—Weingarten, Schurgin, Gagnebin & Lebovici LLP (57) ABSTRACT

An Asynchronous Transfer Mode switch and method which facilitate priority arbitration of point-to-point and point-to-multipoint transmission are disclosed. To execute point-to-multipoint operation a bandwidth arbiter maintains a first list of connections and bit vectors indicating designated destination ports. The list maintained by the bandwidth arbiter is then compared to an unassigned output port bit vector to determine matches therebetween at which point-to-multipoint transmission may be made by utilizing instantaneously unused bandwidth within the switch. To execute point-to-point operation each input port maintains a list of connections associated with each output port, and those lists are used in conjunction with output port request information per input port in the bandwidth arbiter to match requests to the unassigned output port bit vector. The bandwidth arbiter may also assign priority to connections in the list.

29 Claims, 10 Drawing Sheets

| TSPP i+1 | | | | | TSPP i | | | | 56 |
|---|---|---|---|---|---|---|---|---|---|
| y | h | p | q | | m | r | k | a | |
| 0 | 0 | 0 | 1 | | 0 | 1 | 1 | 0 | |
| 0 | 0 | 0 | 0 | | 0 | 0 | 1 | 0 | |
| 1 | 1 | 0 | 0 | | 0 | 0 | 0 | 0 | |
| 0 | 0 | 0 | 0 | | 0 | 1 | 1 | 0 | 58 |
| 1 | 0 | 1 | 1 | | 0 | 0 | 1 | 0 | |
| 0 | 0 | 1 | 0 | | 1 | 0 | 0 | 1 | |
| 0 | 1 | 0 | 0 | | 0 | 0 | 0 | 1 | |
| 0 | 1 | 0 | 0 | | 1 | 0 | 0 | 0 | |

NEWEST      OLDEST

LISTS MAINTAINED BY BANDWIDTH ARBITER 53

PRIORITY ARBITRATION FOR POINT-TO-POINT AND MULTIPOINT TRANSMISSION

RELATED CASE INFORMATION

Claims of priority are made to provisional application No. 60/001,498, entitled COMMUNICATION METHOD AND APPARATUS, filed Jul. 19, 1995 and continuation of application Ser. No. 08/683,153 entitled PRIORITY ARBITRATION FOR POINT-TO-POINT AND MULTIPOINT TRANSMISSION, filed Jul. 18, 1996 now U.S. Pat. No. 5,956,342.

FIELD OF THE INVENTION

The present invention is generally related to telecommunications networks, and more particularly to point-to-point and point-to-multipoint arbitration, bandwidth allocation and delay management within an asynchronous transfer mode switch.

BACKGROUND OF THE INVENTION

Telecommunications networks such as asynchronous transfer mode ("ATM") networks are used for transfer of audio, video and other data. ATM networks deliver data by routing data units such as ATM cells from source to destination through switches. Switches include input/output ("I/O") ports through which ATM cells are received and transmitted. The appropriate output port for transmission of the cell is determined based on the cell header.

One problem associated with ATM networks is loss of cells. Cells are buffered within each switch before being routed and transmitted from the switch. More particularly, switches typically have buffers at either the inputs or outputs of the switch for temporarily storing cells prior to transmission. As network traffic increases, there is an increasing possibility that buffer space may be inadequate and data lost. If the buffer size is insufficient, cells are lost. Cell loss causes undesirable interruptions in audio and video data transmissions, and may cause more serious damage to other types of data transmissions.

In point-to-point transmission a cell is transmitted from a single input port to a single output port across the switch fabric. In point-to-multipoint transmission a cell is transmitted from a single input to multiple outputs across the switch fabric. In order to execute such a transmission, each of the designated outputs must be available to receive the cell from the transmitting input, i.e., have adequate buffer space. However, the likelihood that each of the designated outputs will be simultaneously prepared to receive the cell when the cell is enqueued decreases as traffic within the switch increases. In some circumstances this may result in delayed transmission. In the worst case, cells will be delayed indefinitely and incoming cells for that connection are discarded. It would therefore be desirable to facilitate transmission by reducing or eliminating delays and cell loss.

SUMMARY OF THE INVENTION

An Asynchronous Transfer Mode ("ATM") switch and method which facilitate point-to-multipoint and point-to-point transmission is disclosed. The ATM switch includes a bandwidth arbiter, a plurality of input ports including one To Switch Port Processor ("TSPP") per input port and a plurality of output ports. Each input port within the switch includes a switch allocation table ("SAT") which grants bandwidth to connections. Each SAT includes a plurality of sequentially ordered cell time slots and a pointer which is directed to one of the slots. The SAT pointers at each input port are synchronized such that, at any given point in time, each of the pointers is directed to the same slot location in the respective SAT with which the pointer is associated. Each TSPP maintains a list of point-to-point connections, and more particularly maintains one such list for each output port in the switch. The bandwidth arbiter maintains a bit vector for each port indicating requested output ports for transmission of point-to-point cells.

Each connection is assigned bandwidth types based on the traffic type associated with the connection. There are two types of bandwidth to grant within the switch: allocated and dynamic. Allocated bandwidth is bandwidth which is "reserved" for use by the connection to which the bandwidth is allocated. Generally, a connection with allocated bandwidth is guaranteed access to the full amount of bandwidth allocated to that connection. As such, traffic types that need deterministic control of delay are assigned allocated bandwidth. Dynamic bandwidth is bandwidth which is "shared" by any of various competing connections. Because dynamic bandwidth is a shared resource, there is generally no guarantee that any particular connection will have access to a particular amount of bandwidth. For this reason dynamic bandwidth is typically assigned to connections with larger delay bounds. Other connections may be assigned a combination of dynamic and allocated bandwidth. Any cell time where the SAT entry is not valid or where the scheduling list does not contain a cell thus represents an unassigned bandwidth opportunity.

To execute point-to-point operation the switch employs the point-to-point request bit vectors and round robin operations to grant dynamic bandwidth to point-to-point connections. At the start of the cell time, matches are determined in parallel for each bit in each selected request bit vector and granting is then executed according to a prioritization scheme begining at a first position. Granting opportunities are then provided to the other request bit vectors until granting opportunities have been provided for each request bit vector. A second position indicates an individual bit which receives priority for the granting opportunity. If bandwdith is not granted, granting opportunities are then provided to the other bits in the request bit vector. In the next cell time the first position is then at the next sequential request bit vector relative to the previous cell time if the output port designated by a second position was granted. Otherwise the first position is unchanged. In this manner each TSPP receives equal treatment over time.

To execute point-to-multipoint operation the bandwidth arbiter maintains a list of connections and bit vectors indicating the designated destination ports for a point-to-multipoint cell. The bandwidth arbiter list is then compared to an unassigned output port bit vector generated from the SATs to determine matches therebetween at which point-to-multipoint transmission may be made by utilizing the instantaneously unused bandwidth within the switch. The bandwidth arbiter may also assign priority to connections in the list.

The bandwidth arbiter may also include a combined arbiter mechanism for allocating dynamic bandwidth for both point-to-multipoint and point-to-point connections. In the preferred embodiment each type of connection, i.e., point-to-multipoint and point-to-point, is prioritized into at least two levels of priority such as HI and LO. Dynamic bandwidth is then granted in four main steps. In a first step dynamic bandwidth is granted to HI priority point-to-multipoint connections in the manner described above. In a second step the dynamic bandwidth remaining from the first step is granted to the HI priority point-to-point connections in the manner described above. In a third step the bandwidth remaining from the second step is granted to the LO priority point-to-multipoint connections. In a fourth step the bandwidth remaining from the third step is granted to the LO priority point-to-point connections.

Switch efficiency is increased by utilizing instantaneously unused bandwidth. When switch traffic increases, available bandwidth decreases. Nevertheless, unutilized bandwidth will be present from time to time, and such bandwidth is wasted if not utilized. Therefore, point-to-point and point-to-multipoint transmissions which would otherwise be dropped are made using the otherwise unutilized bandwidth, and switch efficiency is increased. Such use is made possible by the arbitration techniques which reduce delay.

BRIEF DESCRIPTION OF THE DRAWING

These and other features and advantages of the present invention will become apparent from the following detailed description of the drawing in which.

DETAILED DESCRIPTION OF THE DRAWING

Figure 1:
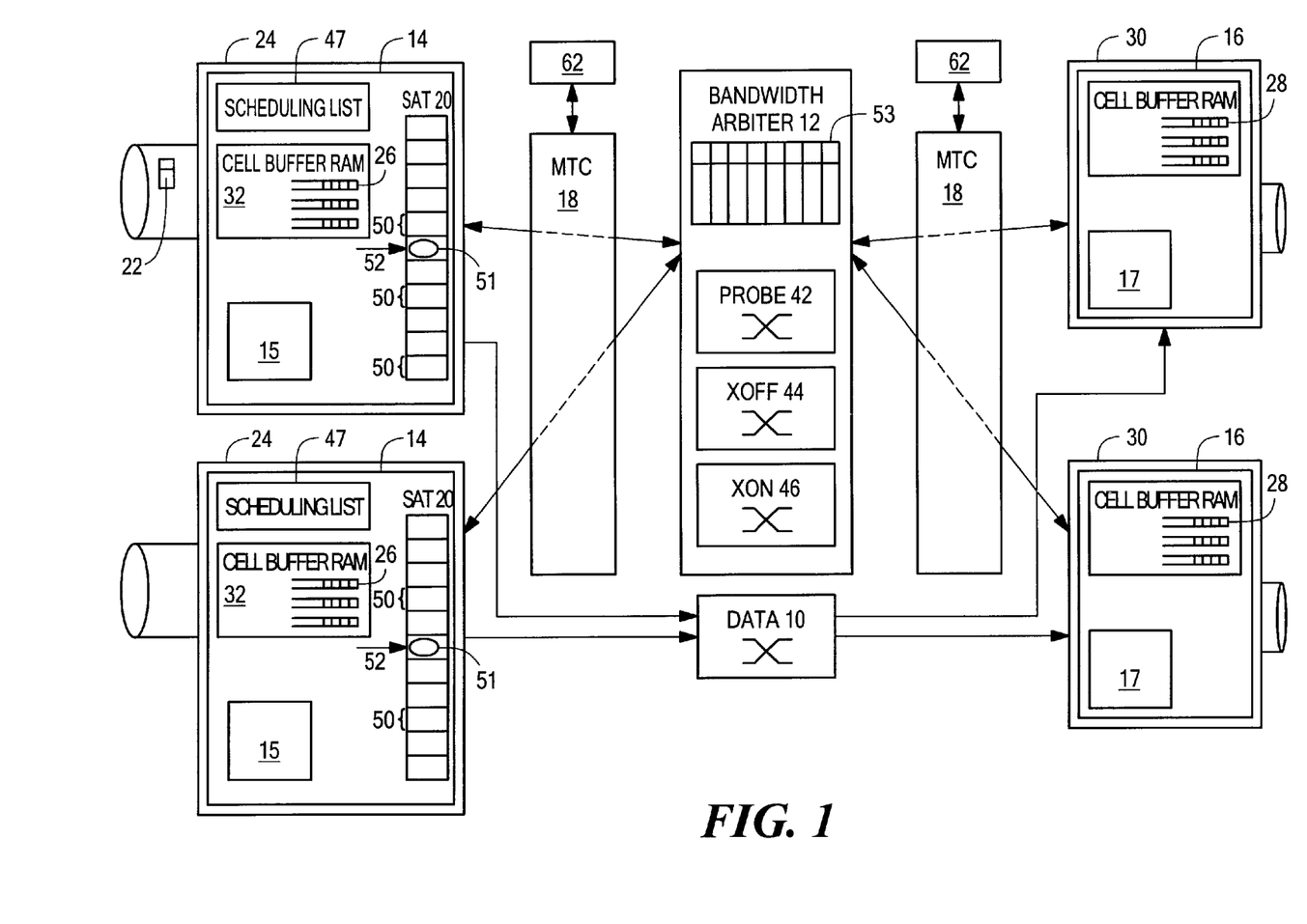
FIG. 1 is a block diagram of a switch which facilitates point-to-multipoint operation.

Referring now to FIG. 1, the switch includes an N×N switch fabric 10, a bandwidth arbiter 12, a plurality of to switch port processor subsystems ("TSPP") 14, a plurality of To Switch Port Processor ASICs 15, a plurality of from switch port processor subsystems ("FSPP") 16, a plurality of To Switch Port Processor ASICs 17, a plurality of multipoint topology controllers ("MTC") 18 and a plurality of switch allocation tables ("SAT") 20. The N×N switch fabric, which may be an ECL crosspoint switch fabric, is used for cell data transport., and yields N×670 Mbps throughput. The bandwidth arbiter controls switch fabric interconnection dynamically schedules momentarily unused bandwidth and resolves multipoint-to-point bandwidth contention. Each TSPP 14 schedules transmission of cells 22 to the switch fabric from multiple connections. Not shown are the physical line interfaces between the input link and the TSPP 14. The FSPP receives cells from the switch fabric and organizes those cells onto output links. Not shown are the physical line interfaces between the output link and the FSPP 16. The switch allocation table controls crossbar input to output mapping, connection bandwidth and the maximum delay through the switch fabric.

In order to traverse the switch, a cell 22 first enters the switch through an input port 24 and is buffered in a queue 26 of input buffers. The cell is then transmitted from the input buffers to a queue 28 of output buffers in an output port. From the output port 30, the cell is transmitted outside of the switch, for example, to another switch. To facilitate traversal of the switch, each input port 24 includes a TSPP 14, and each output port 30 includes an FSPP 16. The TSPPs and FSPPs each include cell buffer RAM 32 which is organized into queues 26, 28. All cells in a connection pass through a single queue at each port, one at the TSPP and one at the FSPP, for the life of the connection. The queues thus preserve cell ordering by handling only one connection per queue. This strategy also allows quality of service ("QoS") guarantees on a per connection basis.

Request and feedback messages are transmited between the TSPP and FSPP to implement flow control. Flow control prevents cell loss within the switch, and is performed after arbitration, but before transmission of the data cell. Flow control is implemented on a per connection basis.

Figure 2:
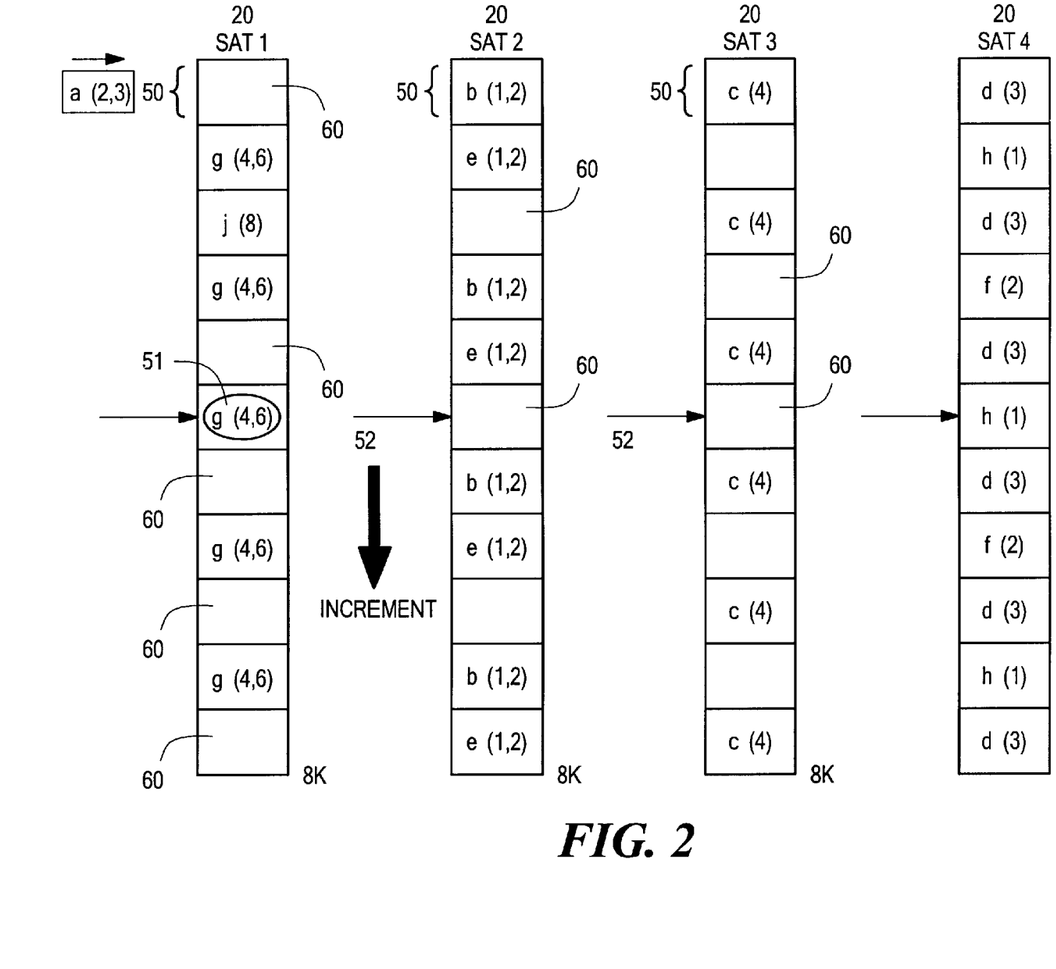
FIG. 2 is a block diagram which illustrates operation of the switch allocation tables of FIG. 1.

Referring now to FIGS. 1 & 2, each TSPP within the switch includes an SAT 20 which manages bandwidth allocation. The SAT is the basic mechanism behind cell scheduling. Each SAT 20 includes a plurality of sequentially ordered cell time slots 50 and a pointer 52 which is directed to one of the slots. All of the pointers in the switch are synchronized such that at any given point in time each of the SAT pointers at each input port is directed to the same slot location in the respective SAT with which the pointer is associated, e.g., the first slot. In operation, the pointers are advanced in lock-step, each slot being active for 32 clock cycles at 50 MHz. When the pointer is directed toward a slot, the TSPP uses the corresponding entry 51 in the SAT to obtain a cell for launching into the switch fabric 10 and to begin flow control.

Each of the counters is incremented once for each cell time, and the pointer returns to the first slot after reaching the last slot. Hence, given an SAT depth of 8 k, which defines a frame, the pointers scan the SATs approximately every 6 msec, thereby providing a maximum delay for transmission opportunity of approximately 6 msec. The delay can be decreased by duplicating a given entry at a plurality of slots within the SAT. The maximum delay that an incoming cell will experience corresponds to the number of slots between the pointer and the slot containing the entry which specifies the destination of the cell. When multiple entries are made in order to decrease the maximum possible number of separating slots, the duplicate entries are therefore preferably spaced equidistantly within the SAT. Maximum delay for transmission opportunity therefore corresponds to the frequency and spacing of duplicate entries within the SAT.

The amount of bandwidth granted to a particular connection corresponds to the frequency at which a given entry appears in the SAT. Each slot 50 provides 64 Kbps of bandwidth. Since the pointers cycle through the SATs at a constant rate, the total bandwidth granted to a particular connection is equal to the product of 64 Kbps and the number of occurrences of that entry. For example, connection identifier "g (4,6)," which occurs in five slots, is granted 320 Kbps of bandwidth.

Significantly, instantaneously unused bandwidth 60 will become available in the switch during operation. Such instantaneously unused bandwidth may occur because that bandwidth, i.e., that entry in the SAT, has not been allocated to any connection. Such bandwidth is referred to as "unallocated bandwidth." Instantaneously unused bandwidth may also occur when the SAT entry is allocated to a connection, but the connection does not have a cell enqueued for transmission across the switch. Such bandwidth is referred to as "unused-allocated" bandwidth. Both types of bandwidth are collectively referred to as "dynamic" bandwidth, and some connections, such as connections assigned an Available Bit Rate ("ABR") QoS level utilize such dynamic bandwidth. The bandwidth arbiter operates to increase efficiency within the switch by granting dynamic bandwidth to such connections.

Figure 3:
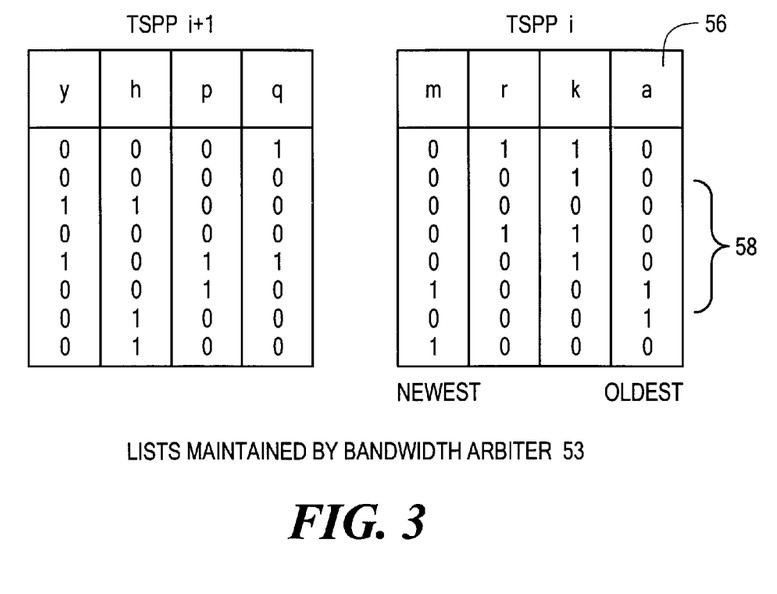
FIG. 3 is a block diagram which illustrates operation of the bandwidth arbiter list.

Referring now to FIGS. 1–3, if a connection has no allocated bandwidth, or if the arriving cell rate is greater than the allocated rate as indicated by an input queue threshold, dynamic bandwidth may be employed. In either situation the point-to-multipoint transmission described in the SAT entry 51 is entered it into a list 53 maintained by the bandwidth arbiter as a "request" in order that the point-to-multipoint transmission can be made at the next available opportunity.

The list 53 maintained by the bandwidth arbiter includes two fields for storing point-to-multipoint transmissions which utilize dynamic bandwidth. A connection identifier field 56 is employed to store the connection identifier, e.g., "a," and hence also indicates the port of origin. A bit vector field 58 is employed to indicate the designated output ports for transmission. The bit vector field is a bit mask which, in the case of an 8×8 switch, includes eight bits, each bit corresponding to a specific output port. Thus, for the exemplary SAT entry "a (2,3)" the list 53 contains "00000110" in the bit vector field (where the port numbers start from "1" rather than "0"). The logic "1" values in the bit vector field indicate destination output ports "2" and "3," and the logic "0" values indicate non-destination output ports. The connections and bit vectors in the list 53 are entered sequentially in the order in which they are received.

In an alternate implementation, point-to-multipoint connections can be divided into subsets. A cell is transferred to each one of these subsets. The point-to-multipoint bit vector lookup would have an additional identifier indicating which subset to transfer the cell to. The lists maintained at the bandwidth arbiter and TSPP would then contain both the connection identifier and the subset identifier. In the current embodiment the subset identifier is called a subqueue.

To execute point-to-multipoint operation of cells described in the list maintained by the bandwidth arbiter the bandwidth arbiter tests for matches between the list and dynamic bandwidth. More particularly, the connection identifier 56 and bit vector 58 corresponding to "a (2,3)" is entered into the list 53 so that the cell will be transmitted when a dynamic bandwidth opportunity becomes available for simultaneous transmission to each output port designated by the request.

Referring now to FIGS. 1–4, to determine matches between the requests in the list maintained by the bandwidth arbiter and available bandwidth, the bandwidth arbiter first calculates an unassigned output port bit vector by ORing all allocated bit vectors from the SAT and toggling each resultant bit to provide a single unassigned output port bit vector. The unassigned output port bit vector is then matched against each request. For a particular input port the entered requests are tested in parallel for a match, and for simplification matching may be made against only the first four requests in the list. If all of the bits in a request match the unassigned bit vector, a match is made. When a match is made, the request is subtracted from the unassigned bit vector, and the result serves as the new unassigned bit vector which indicates remaining available output ports for matching against other input port request bit vectors in the list. After matching against each of the requests, the matched requests are transmitted and the transmitted requests are dequeued from the list.

Figure 4:
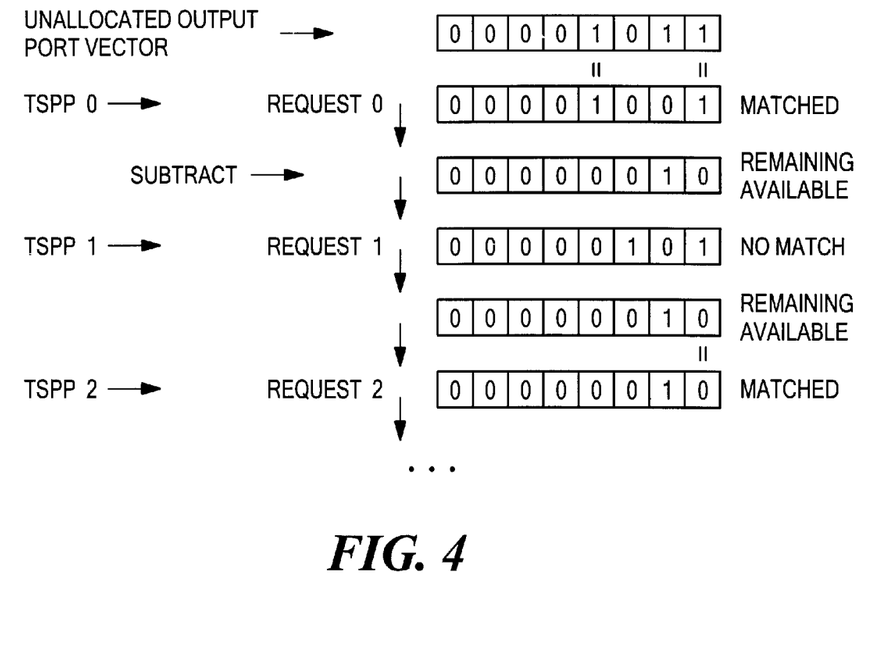
FIG. 4 is a flow diagram which illustrates matching between the request bit vectors and the unassigned output port bit vector.

A prioritization technique may be used in conjunction with the matching operation in the bandwidth arbiter in order to support switch traffic having different priority levels, such as QoS levels. To implement such prioritization each TSPP defines a priority level for each submitted request. Such priority levels could be HI and LO levels, or include greater than two levels. When prioritization is implemented the bandwidth arbiter attempts to match higher priority requests before attempting to match lower priority requests. Since the unassigned bit vector contains less unassigned bits as each subsequent match is made, the higher priority requests are then more likely to obtain a match and be transmitted than the lower priority requests. This higher likelihood for a match translates into a quicker response and greater bandwidth for such higher priority connections.

Figure 5:
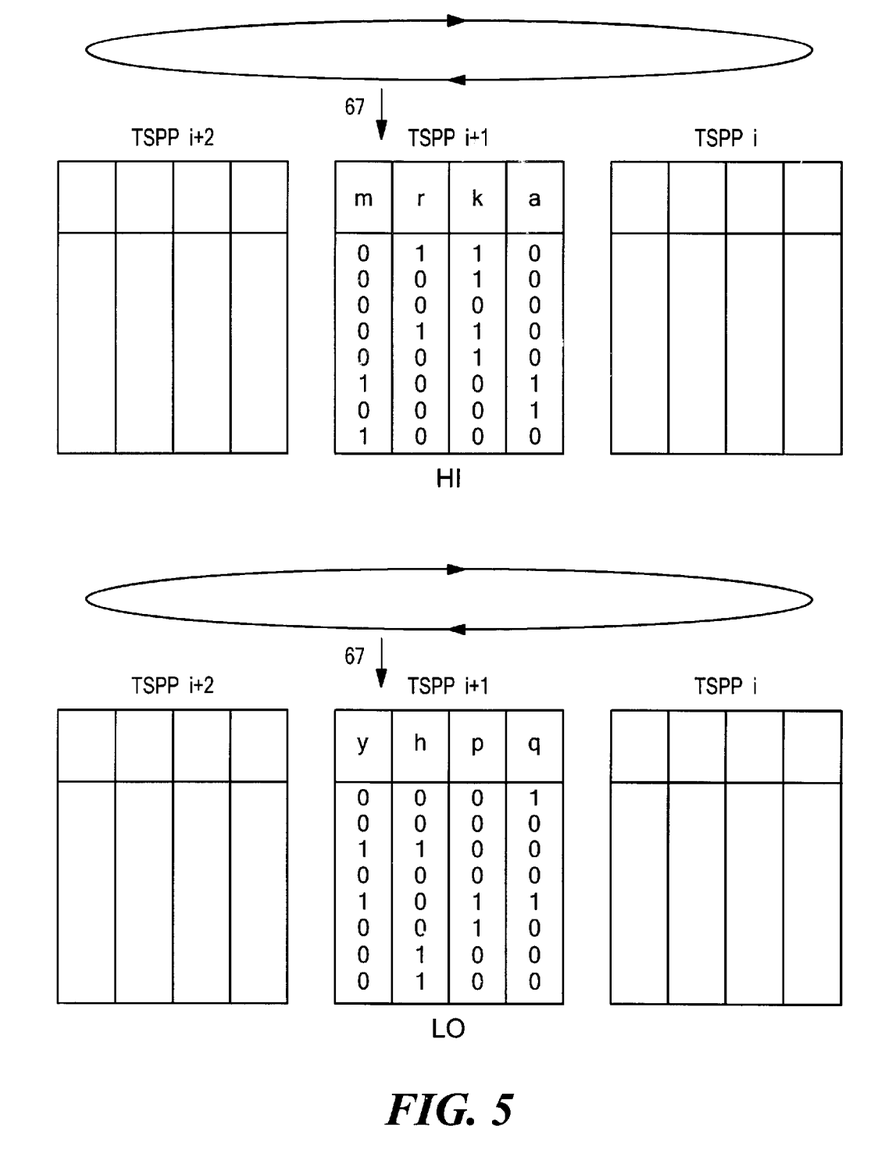
FIG. 5 is a block diagram which illustrates round-robin allocation of bandwidth to TSPP requests.

Referring now to FIG. 5, the bandwidth arbiter may grant bandwidth to requesting TSPPs by attempting to match available bandwidth on a round-robin basis. A pointer 67 is employed to select a TSPP with which matches are first attempted, e.g., TSPP i+1. After attempting matches with TSPP i+1 matches are next attempted with TSPP i+2, and so on ending with TSPP i such that matches are attempted with each TSPP. If the first TSPP (here TSPP i+1) is able to transmit the cell in the oldest entry (here described by connection "a") then the pointer 67 begins with the next TSPP (here TSPP i+2) at the next cell time. However, if the first TSPP is not able to transmit the cell in the oldest entry then the pointer 67 begins with the same TSPP (here TSPP i+1) at the next cell time. When multiple matches are determined for a single TSPP the oldest match is selected for transmission. Thus, every point-to-multipoint connection is guaranteed to receive bandwidth.

When HI and Lo prioritization is employed, separate HI and Lo round-robin operations are executed to grant bandwidth. Each of the round-robin operations operates in the same fashion, but matching is not attempted on the Lo priority requests until a match has been attempted with each of the HI priority requests. Hence, a separate round robin operation is executed for each priority level.

To further insure that there will be opportunities for point-to-multipoint connections to transmit, a portion of unassigned bandwidth, i.e., unassigned SAT entries, may be put aside for dedication to point-to-multipoint transmissions. This technique provides increased opportunity for point-to-multipoint connections which specify a greater number of output ports to be matched and transmitted, and hence no connection will be stuck by being starved for bandwidth.

Figure 6:
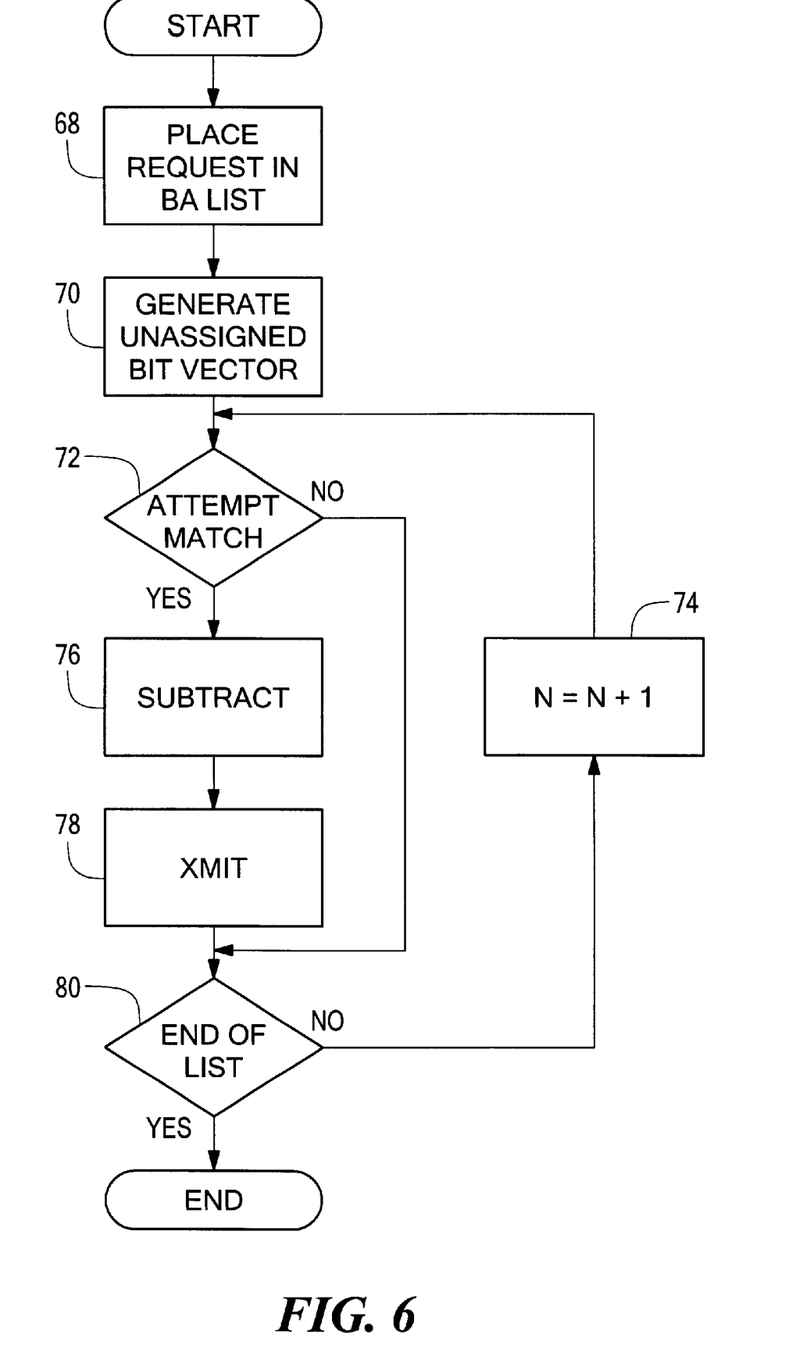
FIG. 6 is a flow diagram which illustrates a method of point-to-multipoint bandwidth arbitration.

FIG. 6 illustrates a method of point-to-multipoint arbitration. In a first step a bit vector representation of the SAT entry is entered 68 into the list as a connection identifier and output bit vector. In the next cell time, the allocated bit vectors are ORed and used to generate 70 the unassigned bit vector. An attempt is then made to match 72 the unassigned bit vector with request N in the list, where N is the oldest request in the list. If no match is made, N is incremented 74 and an attempt is made to match the unassigned bit vector with request N+1, i.e., the next oldest request in the list. If a match is made, the bit vector of the matched request is subtracted 76 from the unassigned bit vector to provide an updated unassigned bit vector. The cell corresponding to the matched request is then transmitted 78, and a determination 80 is made as to whether the end of the list maintained by the bandwidth arbiter has been reached. Flow ends if the end of the list has been reached, i.e., an attempt has been made to match the unassigned bit vector with each request in the list. If the end of the list has not been reached, N is incremented, and an attempt is made to match the next oldest request in the list with the unassigned bit vector.

Figure 7:
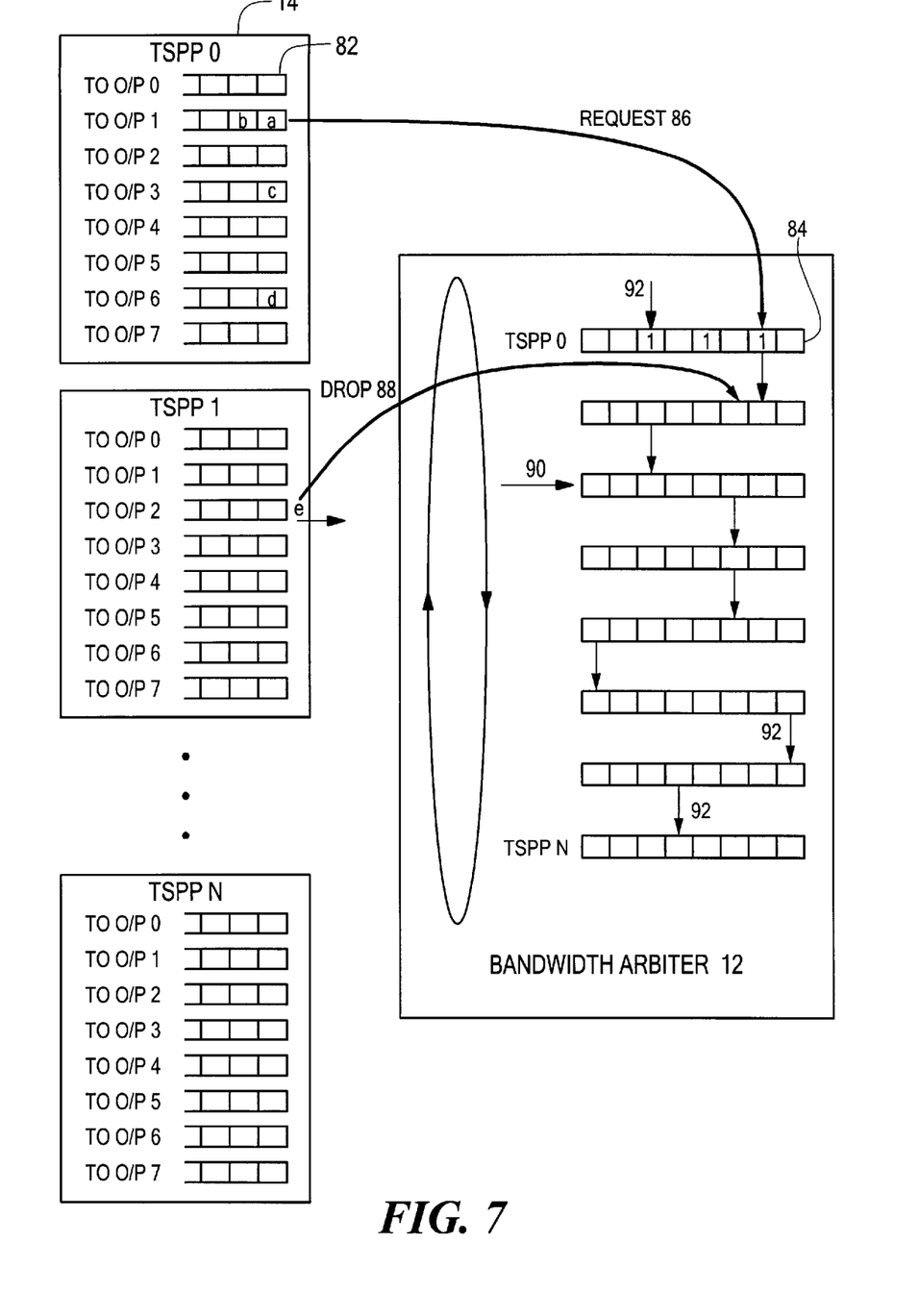
FIGS. 7 & 8 are block diagrams which illustrates point-to-point bandwidth arbitration.

Referring now to FIG. 7, the bandwidth arbiter 12 may also be employed to grant dynamic bandwidth for point-to-point transmission. Each point-to-point transmission is made from a single input port to a single output port. In order to execute point-to-point transmission each TSPP 14 includes a connection list 82 corresponding to each output port in the switch, i.e., one connection list per output port, and the bandwidth arbiter includes a point-to-point request bit vector 84 corresponding to each TSPP in the switch, i.e., one request bit vector per TSPP. The connection lists, which may be 16,384 deep, include a list of connections having cells enqueued for point-to-point transmission to the output port with which the connection list is associated. Each request bit vector is a per-TSPP bitmask which indicates with a logic "1" to which output port each individual TSPP is requesting to transmit. Together the connection lists and request bit vectors are employed to track the output ports for which cells are enqueued in each TSPP, and grant bandwidth based upon that information.

The point-to-point request bit vectors are set in response to signals from the TSPPs. More particularly, when a cell is enqueued for point-to-point transmission the connection associated with that cell is loaded into the TSPP connection list and the TSPP sends a request message 86 to the bandwidth arbiter containing a request to transmit to the output port specified by the connection. For example, when connection "a" is enqueued in connection list 1, TSPP 0 transmits a request message to the bandwidth arbiter, and in response to the request message the bandwidth arbiter sets bit 1 of request bit vector 0 to a logic "1." When the cell is transmitted to the output port, the connection is dequeued from the connection list and, if the connection list thereby empties, a Drop Request 88 message is sent to the bandwidth arbiter. In response, the bandwidth arbiter sets the bit associated with the request to a logic "0." However, if the connection list is not emptied as a result of dequeueing the connection, then the Drop Request message is not sent to the bandwidth arbiter, and the request remains in effect for the next enqueued connection.

Figure 8:
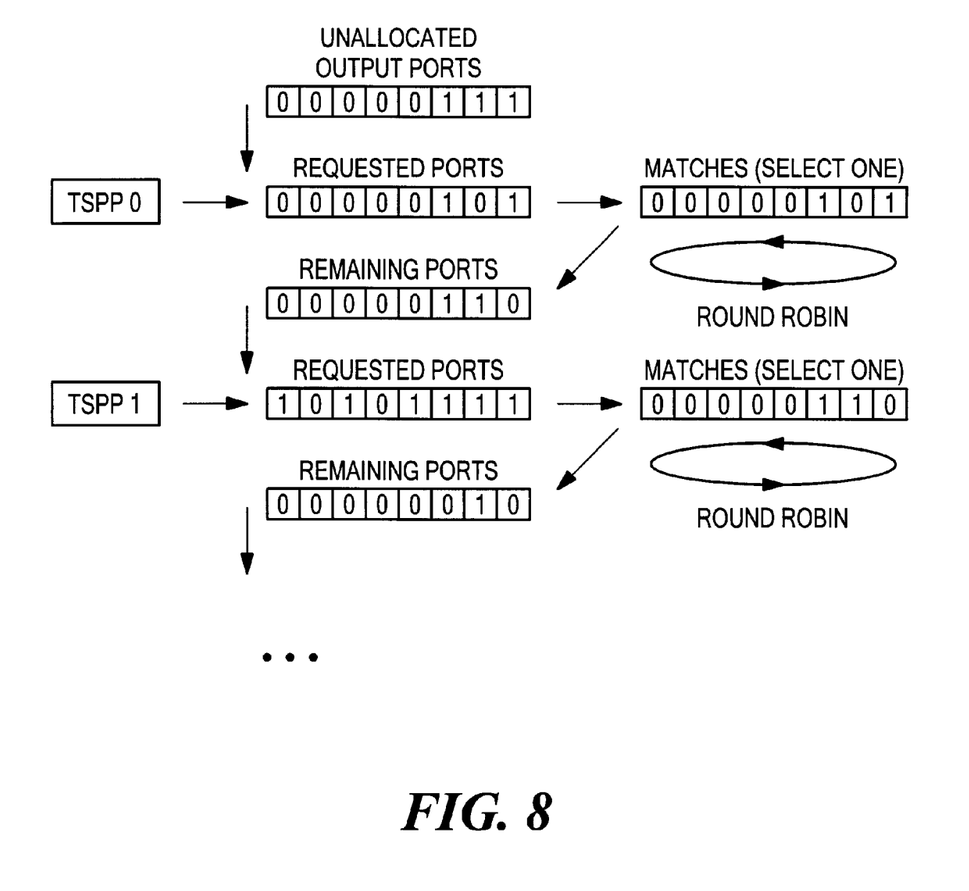

Referring now to both FIG. 7 and FIG. 8, the bandwidth arbiter employs the point-to-point request bit vectors and nested round robin operations to grant dynamic bandwidth to point-to-point connections. At the start of the cell time, matches are determined in parallel for each bit in each selected request bit vector and granting is then executed according to a prioritization scheme begining at a first position such as position 90. Granting opportunities are then provided to the other request bit vectors until granting opportunities have been provided for each request bit vector. A second position 92 indicates an individual bit within the selected request bit vector which receives priority for the granting opportunity. If bandwidth is not granted, granting opportunities are then provided to the other bits in the request bit vector. In the next cell time the first position is then at the next sequential request bit vector relative to the previous cell time if the output port designated by the second position 92 was granted. Otherwise the first position is unchanged. The second position starting point is determined similarly. In this manner each TSPP receives equal treatment over time.

Figure 9:
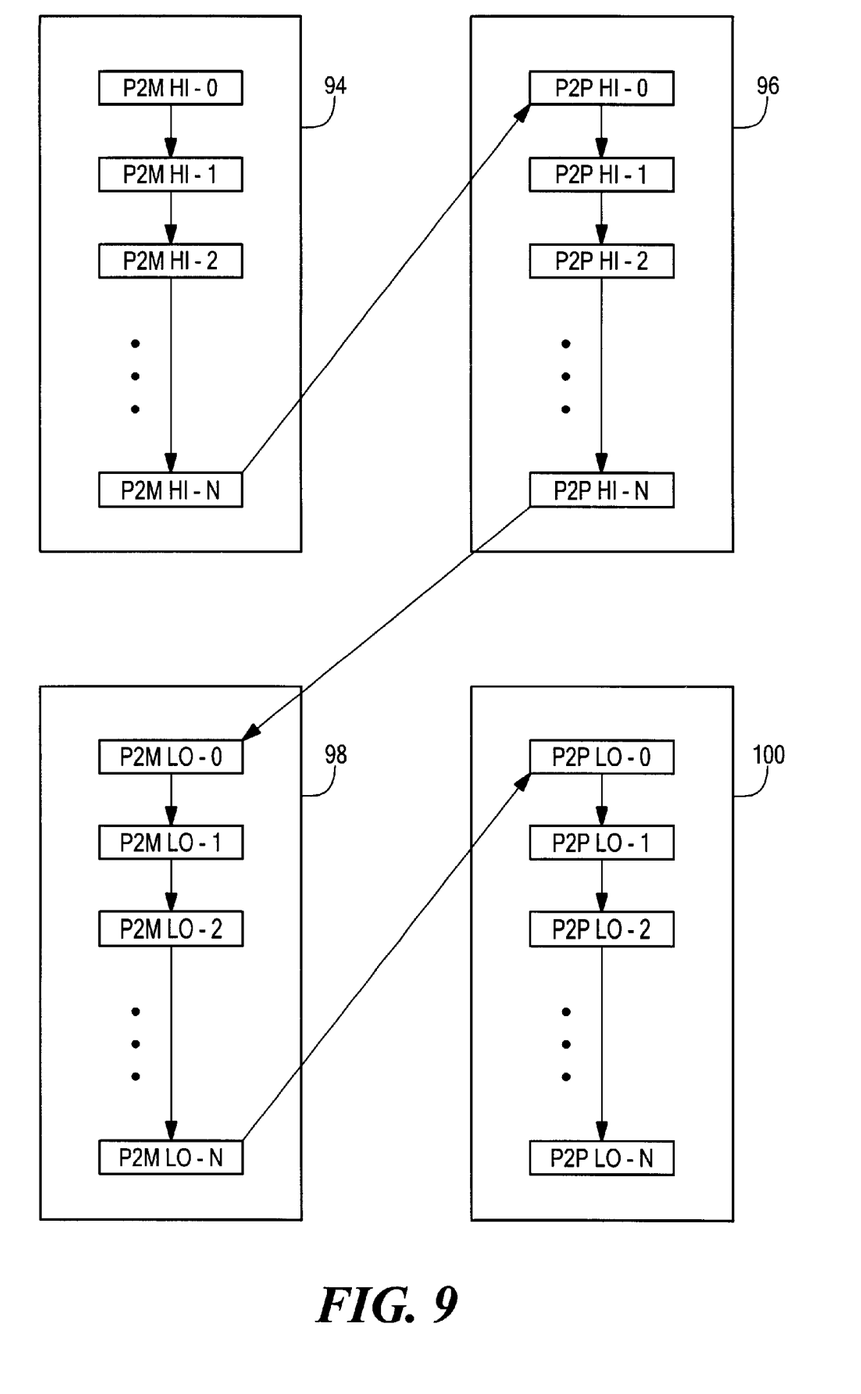
FIG. 9 is block diagram which illustrates combined point-to-point and point-to-multipoint bandwidth arbitration.

Referring now to FIG. 9, the bandwidth arbiter may include a combined arbiter mechanism for granting dynamic bandwidth for both point-to-multipoint and point-to-point connections. In, the preferred embodiment both point-to-multipoint and point-to-point are prioritized into at least two levels of priority such as HI and LO. Dynamic bandwidth is then granted in four main steps. In a first step 94 dynamic bandwidth is granted to HI priority point-to-multipoint connections in the manner described with respect to FIGS. 1–6 above. In a second step 96 the dynamic bandwidth remaining from the first step is granted to the HI priority point-to-point connections in the manner described with respect to FIGS. 7–8 above. In a third step 98 the bandwidth remaining from the second step is granted to the LO priority point-to-multipoint connections. In a fourth step 100 the bandwidth remaining from the third step is granted to the LO priority point-to-point connections.

Figure 10A:
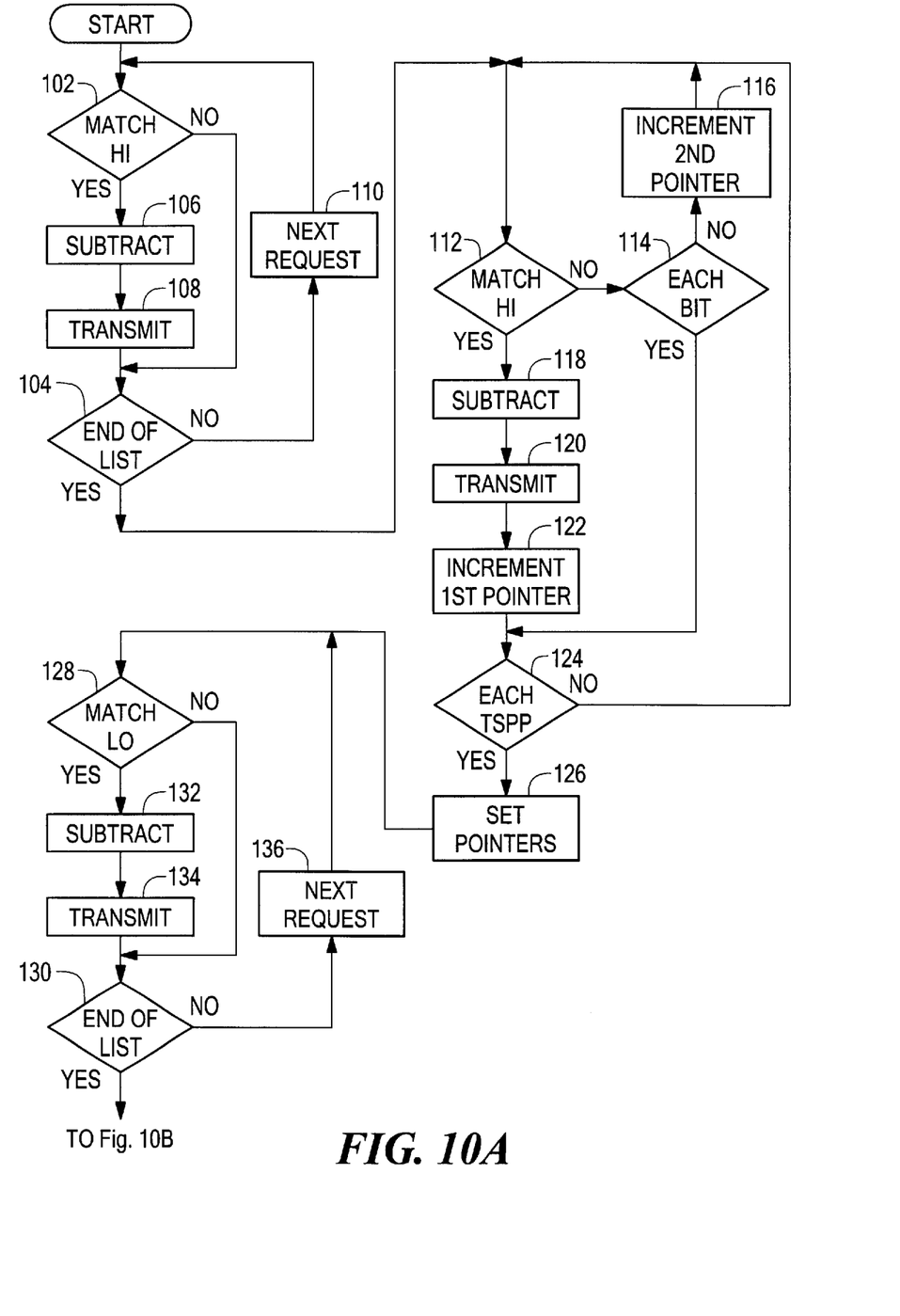
FIGS. 10A and 10B are flow diagrams which illustrate a method for combined point-to-point and point-to-multipoint bandwidth arbitration.
Figure 10B:
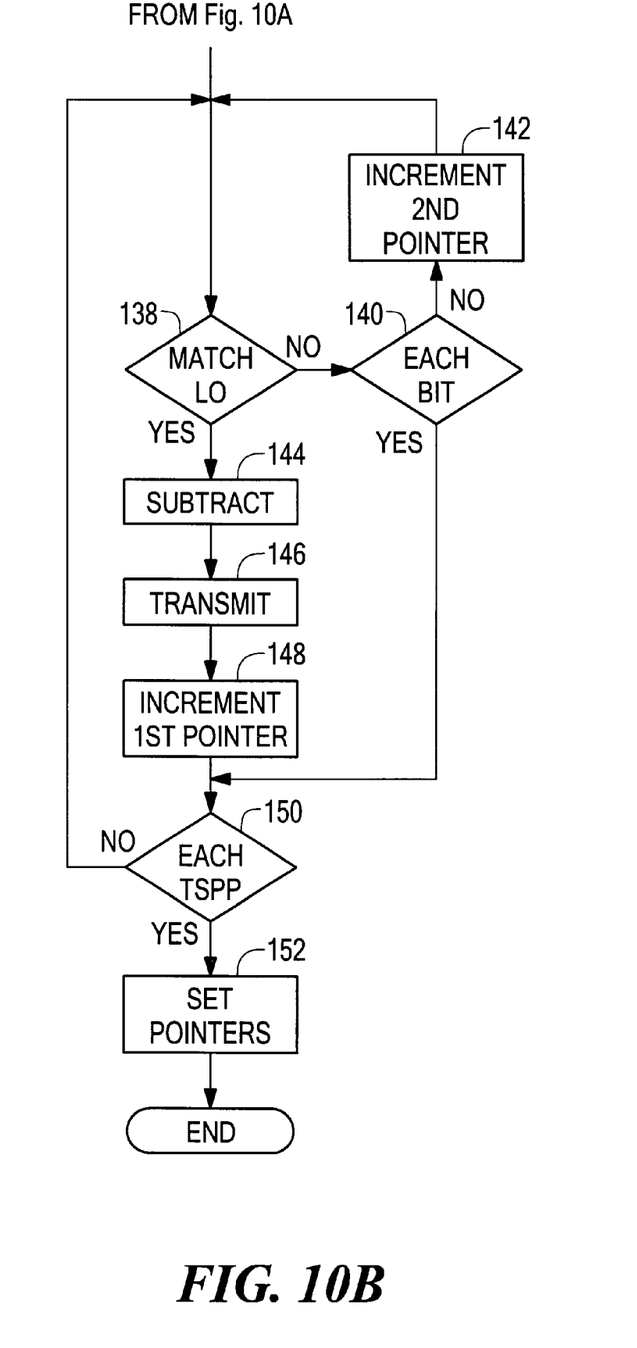

FIGS. 10A and 10B illustrate a method for allocating dynamic bandwidth to both point-to-multipoint and point-to-point connections. In a first matching step 102 an attempt is made to match the first HI priority point-to-multipoint request with the unassigned output port bit vector representing unassigned output ports, i.e., dynamic bandwidth. If no match is made, flow continues to step 104 to determine if the end of the point-to-fit multipoint HI priority list has been reached. If a match is found in step 102, the HI priority point-to-multipoint cell bit vector is subtracted 106 from the unassigned output port bit vector and the cell is transmitted 108. Flow then continues to step 104. If the end of the list has not been reached, then flow continues to step 110 where the next request is loaded, and flow continues at step 102. If the end of the list has been reached, flow continues to a second matching step 112.

In the second matching step 112 an attempt is made to match the first HI priority point-to-point cell indicated by the first and second pointers. If no match is made, flow continues to step 114 where a determination is made whether an attempt has been made with each bit in the point-to-point request bit vector for the TSPP indicated by the first pointer. If each bit has not been tested, the second pointer is incremented 116 and flow continues to step 112. If a match is made in step 112, the selected bit is subtracted 118 from the unassigned output port bit vector and the cell is transmitted 120. The first pointer is then incremented 122. A determination is then made in step 124 whether each TSPP has been tested for matches. If not, flow returns to step 112. If each TSPP has been tested, flow continues to step 126 where the first and second pointers are reset in accordance with the no starvation policy above.

Following step 126 the LO priority point-to-multipoint requests are tested for matches. In a third matching step 128 an attempt is made to match the first LO priority point-to-multipoint request with the unassigned output port bit vector representing unassigned output ports, i.e., dynamic bandwidth. If no match is made, flow continues to step 130 to determine if the end of the point-to-multipoint LO priority list has been reached. If a match is found in step 128, the HI priority point-to-multipoint cell bit vector is subtracted 132 from the unassigned output port bit vector and the cell is transmitted 134. Flow then continues to step 130. If the end of the list has not been reached, then flow continues to step 136 where the next request is loaded, and flow continues at step 128. If the end of the list has been reached, flow continues to a fourth matching step 138.

In the fourth matching step 138 an attempt is made to match the first LO priority point-to-point cell indicated by the first and second pointers. If no match is made, flow continues to step 140 where a determination is made whether an attempt has been made with each bit in the point-to-point request bit vector for the TSPP indicated by the first pointer. If each bit has not been tested, the second pointer is incremented 142 and flow continues to step 138. If a match is made in step 138, the selected bit is subtracted 144 from the unassigned output port bit vector and the cell is transmitted 146. The first pointer is then incremented 148. A determination is then made in step 150 whether each TSPP has been tested for matches. If not, flow returns to step 138. If each TSPP has been tested, flow continues to step 152 where the first and second pointers are reset in accordance with the no starvation policy above. Flow then ends for the cell time.

Having described the preferred embodiments of the invention, it will now become apparent to one of skill in the art that other embodiments incorporating their concepts may be used. It is felt therefore that the invention should not be limited to disclosed embodiments, but rather should be limited only by the spirit and scope of the appended claims.

What is claimed is:

1. A method for forwarding a data unit within a network switch, comprising:
   receiving said data unit at an input port;
   identifying output ports for which no transmission is scheduled during a specified transmission opportunity;
   determining, responsive at least in part to said identified output ports for which no transmission is scheduled during said specified transmission opportunity, whether there is sufficient unused allocated bandwidth to forward said data unit within said network switch during said specified transmission opportunity; and
   forwarding said data unit within said network switch using said unused allocated bandwidth during said specified transmission opportunity, responsive to determining that there is sufficient unused allocated bandwidth to forward said data unit within said network switch during said specified transmission opportunity.

2. The method of claim 1, wherein said unused allocated bandwidth is bandwidth allocated to at least one connection, and which is not scheduled to be used during said specified transmission opportunity.

3. The method of claim 1, further comprising:
   determining whether there is sufficient unallocated bandwidth to forward said data unit within said network switch; and
   forwarding said data unit within said network switch in the event that there is not sufficient unallocated bandwidth to forward said data unit and there is sufficient unused allocated bandwidth to forward said data unit within said network switch during said specified transmission opportunity.

4. The method of claim 3, wherein said unallocated bandwidth is bandwidth that is not reserved to a connection.

5. The method of claim 1, wherein said data unit is a cell.

6. The method of claim 1, wherein said data unit is a plurality of cells.

7. The method of claim 1, wherein said transmission opportunity corresponds to a time slot in a switch allocation table associated with said input port.

8. The method of claim 1, further comprising forming an unassigned output bit vector having bit values indicating said output ports for which no transmission is scheduled during said specified transmission opportunity.

9. The method of claim 8, further comprising forming a request vector.

10. The method of claim 9, further comprising comparing said request vector with said unassigned output vector to determine whether there is sufficient unallocated and unused allocated bandwidth to forward said data unit within said network switch during said specified transmission opportunity.

11. The method of claim 7, wherein said unused allocated bandwidth corresponds to an entry in said allocation table for said time slot,
   said entry is associated with at least one connection; and
   no data unit associated with said at least one connection is scheduled for forwarding during said time slot.

12. A system for forwarding a data unit within a network switch, comprising:
   input port logic operable to receive said data unit at an input port;
   arbitration logic operable to identify output ports for which no transmission is scheduled during a specified transmission opportunity, and to determine, responsive at least in part to said identified output ports for which no transmission is scheduled during said specified transmission opportunity, whether there is sufficient unused allocated bandwidth to forward said data unit within said network switch during said specified transmission opportunity; and
   forwarding logic operable to forward said data unit within said network switch, using said unused allocated bandwidth during said specified transmission opportunity, responsive to a determination that there is sufficient unused allocated bandwidth to forward said data unit within said network switch during said specified transmission opportunity.

13. The system of claim 11, wherein said unused allocated bandwidth is bandwidth allocated to at least one connection, and which is not scheduled to be used during said specified transmission opportunity.

14. The system of claim 12, wherein said
   arbitration logic is operable to determine whether there is sufficient unallocated bandwidth to forward said data within said network switch; and
   said forwarding logic is operable to forward said data unit within said network switch in the event that there is not sufficient unallocated bandwidth to forward said data unit and there is sufficient unused allocated bandwidth to forward said data unit within said network switch during said specified transmission opportunity.

15. The system of claim 14, wherein said unallocated bandwidth is bandwidth that is not reserved to a connection.

16. The system of claim 12, wherein said data unit is a cell.

17. The system of claim 12, wherein said data unit is a plurality of cells.

18. The system of claim 12, wherein said transmission opportunity corresponds to a time slot in a switch allocation table associated with said input port.

19. The system of claim 12, wherein said arbitration logic is operable to form an unassigned output bit vector having bit values indicating said output ports for which no transmission is scheduled during said specified transmission opportunity.

20. The system of claim 19, wherein said arbitration logic is operable to form a request vector.

21. The system of claim 20, further comprising comparison logic operable to compare said request vector with said unassigned output vector to determine whether there is sufficient unallocated and unused allocated bandwidth to forward said data unit within said network switch during said specified transmission opportunity.

22. The system of claim 18, wherein said unused allocated bandwidth corresponds to an entry in said allocation table for said time slot, said entry is associated with at least one connection, and no data unit associated with said at least one connection is scheduled for forwarding during said time slot.

23. A method for forwarding information within a network switch, comprising:

receiving a data unit at an input port;

determining whether said data unit is associated with allocated bandwidth during a specified data unit forwarding opportunity;

identifying output ports for which no transmission is scheduled during said specified transmission opportunity;

determining, responsive at least in part to said identified output ports for which no transmission is scheduled during said specified transmission opportunity, whether allocated bandwidth for said specified data unit forwarding opportunity has not been used; and in the event said data unit is not associated with allocated bandwidth during said data unit forwarding opportunity and allocated bandwidth for said specified data unit forwarding opportunity has not been used, forwarding, at least at some times, said data unit within said network switch using said unused allocated bandwidth during said specified data unit forwarding opportunity.

24. The method of claim 23, wherein said unused allocated bandwidth is bandwidth allocated to at least one connection, and which is not scheduled to be used during said specified data unit forwarding opportunity.

25. The method of claim 23, further comprising:

determining whether there is sufficient unallocated bandwidth to forward said data unit to said at least one output port; and forwarding said data unit to said at least one output port in the event that there is not sufficient unallocated bandwidth to forward said data unit and there is sufficient unused allocated bandwidth to forward said data unit to said at least one output port during said specified data unit forwarding opportunity.

26. The method of claim 25, wherein said unallocated bandwidth is bandwidth that is not reserved to a connection.

27. The method of claim 23, wherein said data unit is a cell.

28. The method of claim 23, wherein said data unit is a plurality of cells.

29. The method of claim 23, wherein said transmission opportunity corresponds to a time slot in a switch allocation table associated with said input port.

* * * * *

UNITED STATES PATENT AND TRADEMARK OFFICE
CERTIFICATE OF CORRECTION

| | |
|---|---|
| PATENT NO. | : 6,539,025 B1 |
| DATED | : March 25, 2003 |
| INVENTOR(S) | : Thomas A. Manning et al. |

Page 1 of 1

It is certified that error appears in the above-identified patent and that said Letters Patent is hereby corrected as shown below:

Column 5,
Line 16, "is entered it into" should read -- is entered into --;

Column 8,
Line 25, "point-to-fit multipoint" should read -- point-to-multipoint --; and Column 10,
Line 33, "claim 11" should read -- claim 12 --.

Signed and Sealed this

Twenty-fourth Day of February, 2004

JON W. DUDAS
*Acting Director of the United States Patent and Trademark Office*